(No Model.)  2 Sheets—Sheet 1.
T. R. MORGAN, Sr.
COMBINED BRAKE AND SPEED REGULATING MECHANISM.
No. 293,059. Patented Feb. 5, 1884.
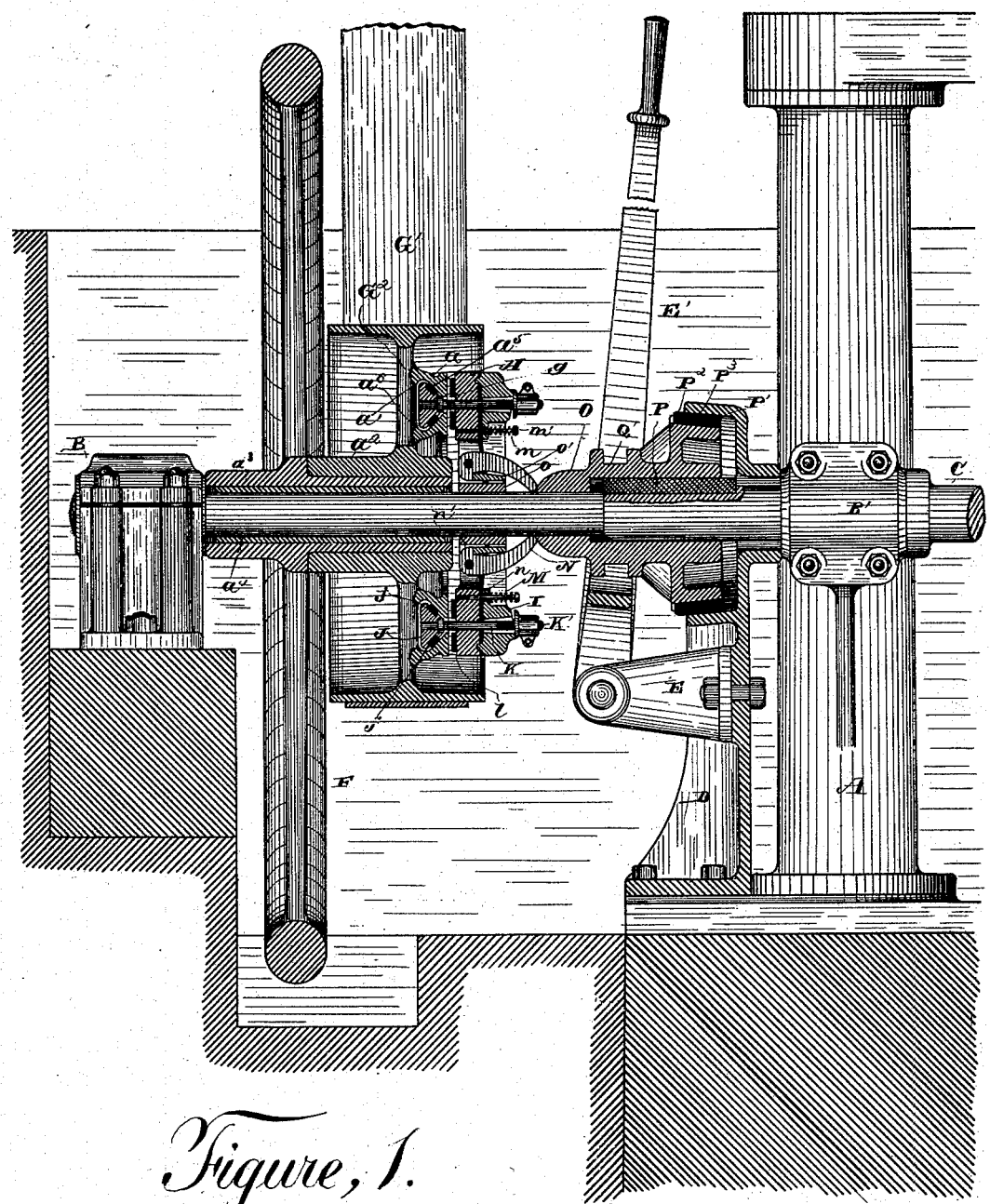
Figure, 1.
Witnesses: Jno. R. Morgan, Henry Heer.
Inventor: Thomas R. Morgan, By H. A. Symons, Atty.

(No Model.) 2 Sheets—Sheet 2.
T. R. MORGAN, Sr.
COMBINED BRAKE AND SPEED REGULATING MECHANISM.
No. 293,059. Patented Feb. 5, 1884.
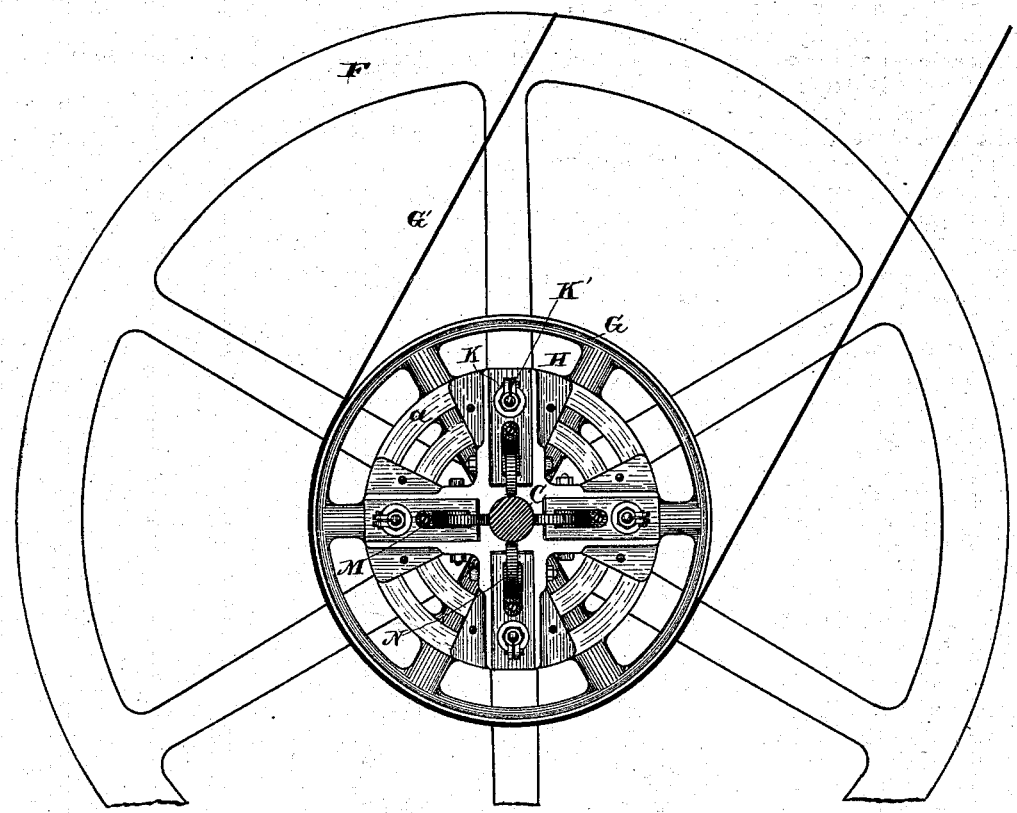
— Figure, 2. —
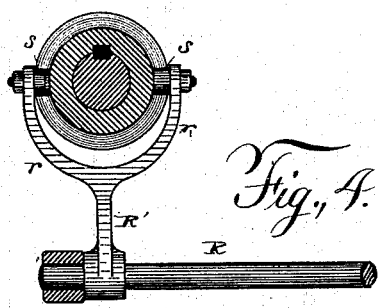
Fig. 4.
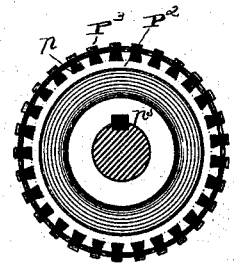
Fig. 3.
Witnesses: Jno. R. Morgan, Henry Heer.
Inventor: Thomas R. Morgan,
By H. A. Seymour, Atty.

UNITED STATES PATENT OFFICE.

THOMAS R. MORGAN, SR., OF ALLIANCE, OHIO.

COMBINED BRAKE AND SPEED-REGULATING MECHANISM.

SPECIFICATION forming part of Letters Patent No. 293,059, dated February 5, 1884.

Application filed November 26, 1883. (No model.)

*To all whom it may concern:*

Be it known that I, THOMAS R. MORGAN, Sr., of Alliance, in the county of Stark and State of Ohio, have invented certain new and useful Improvements in a Combined Brake and Speed-Regulating Mechanism; and I do hereby declare the following to be a full, clear, and exact description of the invention, such as will enable others skilled in the art to which it appertains to make and use the same.

My invention relates to a combined brake and speed-regulating mechanism, the object being to provide the driving-shaft that actuates a machine with a fly-wheel, clutch, and brake, the parts to be arranged so that the fly-wheel may be locked to the driving-shaft, and thereby render the operation of the machine uniform and constant, and a brake for stopping the shaft at any point of its rotation, and at the same time disconnecting the fly-wheel from the shaft, and allowing it to rotate independently therefrom.

With these ends in view my invention consists, essentially, in the combination, with a shaft, fly-wheel, and driving-belt pulley, of a clutch and brake mechanism, the parts being arranged so that when the driving-pulley is locked to the shaft the brake will be disengaged therefrom, and, on the other hand, when the brake is applied and the movement of the shaft arrested, the band-pulley will be simultaneously disconnected from its shaft and allowed to run as an idle-pulley.

My invention further consists in certain features of construction and combinations of parts, as will be hereinafter described, and pointed out in the claims.

In the accompanying drawings, Figure 1 is a view, partly in side elevation and partly in longitudinal section, of my improvement. Fig. 2 is a view in side elevation of the clutch. Fig. 3 is an end elevation of the brake-wheel or cone. Fig. 4 is a detached view of the shifting-collar.

A represents an upright frame provided with a journal-bearing, B', in which is supported the shaft C, the end of which is journaled in the bearing B, attached to any suitable upright.

F is a fly-wheel, constructed with an elongated sleeve-bearing, $a^3$, which is mounted upon a sleeve-bearing, $a^4$, encircling the shaft C. Driving-pulley G is firmly secured upon one end of a sleeve-bearing, $a^2$, of the fly-wheel, whereby the driving-pulley rotates with the fly-wheel.

$G^2$ are the spokes of the driving or belt pulley, and have cast integral therewith the segmental friction-surfaces $a$, the rear sides of which are constructed with wide openings $a'$, while their front faces are formed with narrow arch-shaped openings $g$. These friction-surfaces are made with converging walls $a^5$, for a purpose hereinafter described.

H is a cross-bar, provided with a sleeve, $o$, that is firmly secured to the shaft C. A yielding face-plate, I, is connected to the cross-bar H by means of screws M, which are inserted through openings in the flanges $n$ of the yielding face-plate, and engage in screw-threaded sockets or openings in the cross-bar H. Screws M are encircled by spiral springs $m$, the inner ends of which rest against the flanges $n$ on the yielding face-plate I, while their outer ends bear against the heads $m'$ of the screws. By tightening or loosening the screws, the tension of the spiral springs may be regulated as desired. These springs serve to force the yielding plate I against the cross-bar H.

Through openings in the face-plate and cross-bar are inserted the bolts K, to the inner ends of which are secured the triangular friction-blocks J, the converging faces of which are provided with recesses, in which are detachably secured the friction wearing blocks $j$, which engage the converging walls of the friction-surfaces $a$ on the driving or band pulley G. The outer ends of the bolts K are screw-threaded, and provided with lock-nuts K.

To the cross-bar H are pivoted the curved levers N, the short arms $n'$ of which engage the projections $o'$ on the yielding face-plate I, while the long arms of said curved levers engage the conical end of the shifting collar O. Hand-lever E' is secured at one end to a rock-shaft, R, journaled in suitable bracket-bearings, E, which are bolted to the upright D.

To the rock-shaft R is secured the forked arm R', having forks or fingers $r\ r$, in the outer ends of which are mounted pins or studs carrying anti-friction rollers $s\ s$, that engage in the annular groove Q of the sliding collar O. The sliding collar O is secured to the shaft C by means of the key or spline P, which arrangement allows said collar to rotate with the shaft and still have an endwise sliding movement thereon. One end of the sliding collar O has cast thereon a disk provided with a conical periphery, $P^2$, in which is formed a series of undercut grooves $p$.

Within the undercut grooves $p$ are removably secured the friction-blocks $P^3$, which latter engage with the stationary friction-surface $P'$, which is preferably cast integral with the upright D.

Having described the construction and arrangement of the several parts of my improvement, I will now briefly describe its operation.

When the parts are in the position indicated in Fig. 1, the brake is applied to the shaft C and the latter held at rest, while the fly-wheel F and the band-pulley G are rotated by means of the driving-belt $G'$. By shifting the lever $E'$ to the left the brake is disengaged, and at the same time the conical sleeve O forces apart the long arms of the lever N, causing their shorter arms, $n'$, to engage the projection $o'$ on the yielding face-plate I and force the latter outwardly or away from the cross-bar H and, through the bolts K, draw the friction-surface on the pulley G in contact with the friction-blocks $l$ on the adjacent face of the cross-bar H, and also to force the friction-blocks $a^5$ in snug contact with the friction-surfaces $a$, and thus firmly lock the band or driving pulley G and fly-wheel F to the shaft C and rotate the latter. By imparting an opposite movement to the lever $E'$ the pulley and fly-wheel are disengaged from the shaft and rotate independent thereof, while the brake mechanism arrests the movement of the shaft and retains it in a stationary position.

This improvement is an important and valuable attachment to machines for stamping tinware and other machines that require to be stopped and started at any portion of their stroke, and hence I do not limit myself to any particular application of this improvement; neither do I restrict myself to the construction and arrangement of parts shown and described, as it is evident that many changes might be resorted to without departing from my invention.

Having fully described my invention, what I claim as new, and desire to secure by Letters Patent, is—

1. The combination, with a shaft, driving-pulley, and fly-wheel, of clutch and brake mechanism, constructed and arranged substantially as set forth.

2. The combination, with a shaft and band-pulley, of a friction-clutch, friction-brake, and a hand-lever, the parts being constructed and arranged so that by moving the hand-lever in one direction the clutch will lock the band-pulley to the shaft, and also move the friction-brake disk longitudinally on the shaft and release the brake, while an opposite movement of the hand-lever will release the band-pulley and apply the brake, substantially as set forth.

3. The combination, with a shaft, of a fly-wheel and band-pulley, constructed and arranged to be rotated independently of the shaft, and clutch mechanism for locking the fly-wheel and band-pulley to the shaft and causing them to rotate therewith, substantially as and for the purpose set forth.

4. The combination, with a shaft, a fly-wheel provided with an elongated sleeve, and a band or driving pulley attached to said sleeve, of a clutch secured to said shaft, and devices for locking the band-pulley to said clutch by frictional contact therewith, substantially as and for the purpose set forth.

5. The combination, with a band-pulley having frictional surfaces $a$ cast integral therewith, of the cross-bar secured to the shaft, the yielding face-plate, curved levers, conical sliding collar, and frictional wearing blocks or plates, substantially as and for the purpose described.

6. The combination, with the shaft, fly-wheel, band-pulley, and clutch, of the sliding collar provided with wearing-blocks and a stationary friction-surface, constituting a friction-brake for the shaft, substantially as and for the purpose set forth.

In testimony whereof I have signed this specification in the presence of two subscribing witnesses.

THOMAS R. MORGAN, Sr.

Witnesses:
JOHN H. LLOYD,
SAM. S. WEBB.